UNITED STATES PATENT OFFICE 2,589,294

VINYLIDENE CYANIDE POLYMERS AND POLYMER PRODUCTS

Richard F. Schmidt, Cuyahoga Falls, and Alan E. Ardis and Harry Gilbert, Akron, Ohio, assignors to The B. F. Goodrich Company, New York, N. Y., a corporation of New York No Drawing. Application February 26, 1948, Serial No. 11,336

10 Claims. (Cl. 260—30.2)

This invention relates to high molecular weight, linear polymers of vinylidene cyanide and to methods of preparing the same as well as to solutions of such polymers in certain organic solvents and to shaped articles such as filaments and films prepared therefrom.

The preparation of monomeric vinylidene cyanide is disclosed in copending applications, Serial No. 775,149, filed September 19, 1947, Serial No. 785,520, filed November 12, 1947, now U. S. Patent 2,476,270, and Serial No. 63,434, filed December 3, 1948, now U. S. Patent 2,502,412. As is disclosed therein, difficulty is encountered in obtaining vinylidene cyanide in the monomeric form unless a suitable polymerization inhibitor such as phosphorus pentoxide is present because of the fact that the presence of water, or other sources of hydroxyl ion, causes polymerization or polycondensation of the monomeric material to occur to form an amber-colored, resinous material of low-molecular weight and apparently of a cross-linked, non-linear structure. Although this polymer is quite easily obtained, it is of little or no utility because of its color, its low-molecular weight and its tendency to degrade under various conditions.

We have now discovered that when monomeric vinylidene cyanide is polymerized in a completely organic medium free from ions (i. e., in the absence of materials which supply ions such as water, and aqueous solutions of inorganic acids, bases and salts), vinylidene cyanide polymers are formed which are substantially linear in nature, apparently possessing the structure:

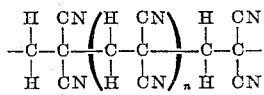

and possess a molecular weight in excess of 25,000, and usually in the range of 100,000 to 500,000, as calculated from viscosity measurements by the Staudinger equation:

$$\text{Molecular Weight} = \frac{Nsp}{KmC}$$

wherein $Km = 1.5 \times 10^{-4}$ $Nsp = \text{specific viscosity} = \dfrac{\text{Viscosity of solution}}{\text{Viscosity of solvent}} - 1$ and $C$ = Concentration of the solution expressed as the number of moles of the monomer (calculated) per liter of solution Such polymers are hard, tough, substantially clear and colorless resinous materials which are extremely stable to conditions and agents which degrade most linear polymers. They are stable to heat and are substantially completely unaffected by acids, corrosive chemicals, mineral and vegetable oils and greases and are resistant to sunlight, oxygen, ozone, water and other weathering and aging conditions. They are insoluble in and unaffected by most organic solvents, including many solvents which will dissolve the relatively insoluble polyacrylonitrile, but will dissolve readily in certain solvents particularly dimethyl formamide and tetramethylene sulfone. Because of these and other properties they are extremely valuable in the production of films and filaments and other shaped articles of outstanding properties for many different purposes.

Such high molecular weight linear polymers of vinylidene cyanide may be prepared by several general methods. One method consists in dissolving monomeric vinylidene cyanide in an anhydrous organic solvent which dissolves but does not chemically react with the monomer and is a non-solvent for the polymer, and maintaining the solution under conditions such that it retains its liquid anhydrous character, whereupon polymerization occurs and finely-divided polymer particles precipitate from the solution as they are formed. Preferred solvents are the liquid aromatic hydrocarbons, and especially benzene and homologs of benzene such as toluene, ortho, meta, and para-xylene, trimethyl benzenes, ethyl benzene and the like. Other solvents which may be used include liquid aliphatic and alicyclic hydrocarbons, liquid chlorinated hydrocarbons and liquid ethers. The monomer solvent ratio is not critical and may be varied considerably. The polymer is most conveniently prepared, however, by using from 5 to 15 percent by weight of monomer in 85 to 95 percent by weight of solvent.

The rate at which vinylidene cyanide polymerizes in solution in an anhydrous aromatic hydrocarbon is quite slow when no polymerization catalyst is employed. (In fact, the solutions are quite stable at room temperature even when no polymerization inhibitor is present, and may be stored for some time without appreciable polymerization, which is quite advantageous since monomeric vinylidene cyanide stored in the absence of added materials exhibits a tendency to polymerize quite rapidly.) As a result, it is desirable that a polymerization catalyst be present. The preferred catalysts are diazothioethers such as para-methoxy-diazo-thiobenzene, para-chlorophenyl-diazo-thiobenzene and particularly diazo-thio-naphthalenes such as para-methoxy-diazo-thio-naphthalene, para-chlorophenyl - diazo - thionaphthalene, phenyl - diazo - thionaphthalene, para - methyl - phenyl-diazo-thionaphthalene, para-ethoxyphenyl-diazo-thionaphthalene, para - ethylphenyl - diazo-thionaphthalene and the like, although other organic polymerization catalysts such as benzoyl peroxide, acetone peroxide, caproyl peroxide, lauroyl peroxide, crotonyl peroxide, tert.-butyl hydroperoxide and the like may also be used. The amount of catalyst used may be varied widely. For example, amounts as small as 0.1% by weight based on the monomer or even smaller to 2.0% or more may be utilized. The polymerization by this method is substantially complete in from 15 minutes to 1 hour when a catalyst is used.

A second method of preparing high molecular weight, linear polymers of vinylidene cyanide consists in dissolving the monomer in an anhydrous organic liquid which is a solvent for both the monomer and the polymer, adding a polymerization catalyst, preferably one selected from those listed hereinabove, and then maintaining the solution under temperature conditions such that it retains its liquid form, for example at 20° to 75° C., whereupon polymerization proceeds, forming a mushy solution which upon heating at 75 to 125° C. changes to a true polymer solution which is especially adapted to spinning or casting. Tetramethylene sulfone and dimethyl formamide have been found to be suitable solvents for use in this process. The amount of tetramethylene sulfone or dimethyl formamide used in the polymerization process may be varied widely, although it is desirable to use from 75 to 93% by weight of solvent, especially if the resulting polymer solution is to be used in the preparation of filaments and films. Polymerization by this method also proceeds satisfactorily without the use of a polymerization catalyst, although the polymerization requires a somewhat longer period of time.

Suitable polymers of vinylidene cyanide may also be prepared simply by polymerizing the monomer alone in the absence of water. For example, when pure monomeric vinylidene cyanide either with or without added polymerization catalyst is kept in a water-free atmosphere, it polymerizes to a polymer which has the desirable properties set forth hereinabove. The polymerization may also be carried out by other known methods so long as conducted in a medium such as disclosed above, that is, a completely organic medium free from ions. In addition to carrying out the polymerization in an ion-free medium, it is also desirable that the medium in which polymerization is taking place be free of materials other than monomer, organic solvents for either monomer or polymer or both, and polymerization catalyst, since the presence of impurities sometimes tends to degrade the polymer, and consequently, the polymers are of lesser value in the preparation of spinning and casting solutions.

The polymers of vinylidene cyanide prepared according to the above methods are readily adapted to the preparation of articles having one dimension of less than about an inch, that is, filaments and thin films which articles possess astoundingly high tensile strength and excellent flexural properties in addition to being colorless and unaffected by the action of chemicals. The polymers are also useful in the preparation of molded objects such as rods, tubes and other shaped articles.

Continuous filaments are easily prepared by spinning a solution of the polymer in dimethyl formamide or tetramethylene sulfone or other solvent therefor. As mentioned above the polymerization may be effected in a solvent for the polymer so that such solutions are obtained directly from the monomer. If the polymer is obtained in solid form solutions thereof may be prepared simply by adding the solvent to the solid polymer in finely divided form and stirring. Solutions of any desired concentration may be prepared, but for spinning solutions, it is desirable that the polymer concentration be from 7 to 25%. At room temperature the polymer solution is a mass having a mushy, translucent appearance. Raising the temperature causes the gel to change to a true solution form. Therefore, it is desirable in spinning operations that the temperature be above 75° C. and preferably from 75° to 125° C., although higher temperatures may be used depending on the viscosity desired in the spinning operation. The spinning process may be conducted in any of the conventional manners of spinning filaments from polymer solutions. For example, a preferred method consists in wet spinning the polymer through a single or multiholed spinneret into a bath comprising a liquid which will extract the solvent, but which is not a solvent for the vinylidene cyanide polymer. Nitrobenzene is a preferred material for the spinning bath, although other substances such as nitroethane, nitromethane, acetone, dioxane, ethylene dichloride, glycerin, alcohols, water and the like or mixtures of the above substances are also suitable for this purpose. A combination of two or more baths may also be advantageously used, the first bath comprising a substance which has a slight precipitating effect on the polyvinylidene cyanide giving a fiber which is self-supporting, and the subsequent bath or baths being used to extract the liquid from the first bath which remains in the filament. For example, a nitrobenzene bath followed by a bath composed of acetone and water provide a bath combination from which excellent filaments can be easily obtained. The use of a relatively volatile solution such as a water-acetone mixture, also decreases the time required for drying the filaments. The filaments pass from the bath solutions through a drying atmosphere such as air, steam, nitrogen or the like onto bobbins, cones or other suitable means. Stretching of the filament is preferably accomplished during spinning by passing the filaments between rolls rotating at speeds which increase from roll to roll. The filaments may be stretched as much as 500% or more of their original length by this method.

Filaments of linear polyvinylidene cyanide may also be dry spun by extruding polymer solution through a conventional spinneret into a spinning cell through which is passed an inert evaporative medium such as those mentioned hereinabove to evaporate the solvent from the extruded filament.

Filaments prepared by the above methods are characterized in that they exhibit a crystalline pattern when examined by X-ray diffraction methods. The orientation of the linear polymer molecules results in filaments and films having a tensile strength and flexibility greatly in excess of that obtained from vinyl and vinylidene polymers commonly used in the preparation of filaments. For example, it is possible to obtain filaments having tensile strengths in excess of 50,000 p. s. i.

The filaments prepared from linear polymers of vinylidene cyanide are further characterized in that they are generally colorless or slightly yellow and preferably range in size from 0.0004" to 0.02" in diameter although smaller or larger filaments may be prepared.

Polymeric vinylidene cyanide may also be cold drawn, that is by drawing polymer in the molten form through an orifice into an atmosphere of air, whereupon filaments are obtained which possess strength and flexural properties comparable to those prepared from polymer solutions.

Films possessing properties similar to those of the filaments may also be prepared from solutions of polymeric vinylidene cyanide simply by casting the solution, preferably having a polymer concentration of from 10 to 25% by weight, onto a heated surface, the film depositing as the solvent evaporates. Thin films or films of any desired thickness may be prepared in this manner.

Molded objects of any desired shape may also be prepared from monomeric vinylidene cyanide simply by placing monomer in a mold and heating until the monomer is polymerized to a hard, clear form. Polymerization catalysts, preferably selected from the group listed hereinabove, increase the rate of polymerization and may be used if desired.

The following examples illustrate the preparation of polymers of vinylidene cyanide according to the method of this invention and the use of solutions of such polymers in the preparation of filaments and other shaped articles. It is to be understood that the invention is not limited by the specific examples, for there are, of course, numerous modifications and variations. All parts are by weight.

Example I 15 parts of monomeric vinylidene cyanide are dissolved in 85 parts of dry, thiophene-free benzene. 0.3 part of beta-naphthalene-diazobeta-mercapto naphthalene are added as a polymerization catalyst. The solution is then heated to 45° C. for 60 minutes, whereupon small particles of hard, clear polymer settle out. The benzene is decanted and 15 parts of the polymer thus formed are dissolved in 85 parts of tetramethylene sulfone. The mixture is heated to 100° C. whereupon a clear solution is obtained. The solution is then extruded through a single-holed spinneret into a nitrobenzene bath, followed by a bath composed of 60% acetone and 40% water, both baths being maintained at room temperature. The filament is then steam dried. The filament is clear and flexible and has a tensile strength of 51,000 p. s. i.

Example II 5 parts of monomeric vinylidene cyanide are dissolved in 95 parts of dry, thiophene-free benzene and 0.7 part of para-methoxyphenyl-diazo-thionaphthalene are added as catalyst. After 65 minutes 95% of the monomer has polymerized and settled out as very fine particles. After removing the benzene, 20 parts of the polymer are dissolved in 80 parts of tetramethylene sulfone. This solution is then heated to 75° C. and extruded through a spinneret into a nitro-ethane bath and after 3 minutes into a water acetone bath. A water-white filament is formed having a tensile strength of 43,000 p. s. i.

Example III 15 parts of monomeric vinylidene are dissolved in 85 parts of tetramethylene sulfone and 0.1 part of benzoyl peroxide is added as a polymerization catalyst. The mixture is then heated at 45° C. for 4 hours. The vinylidene cyanide polymerizes and the polymer thus formed dissolves in the tetramethylene sulfone. The polymer solution is then heated to 100° C. and spun through a spinneret into a nitrobenzene bath. After 15 minutes in the nitrobenzene the filament is soaked for fifteen minutes in a bath composed of 50 parts water and 50 parts acetone, removed from the bath and stretched while drying in air. The resulting filament has a tensile strength of 38,000 p. s. i.

Example IV 5.4 parts of monomeric vinylidene cyanide are dissolved in 30.6 parts of tetramethylene sulfone. Upon standing for 16 hours at room temperature, the vinylidene cyanide has polymerized. The resulting solution is then heated to 100° C., spun through a spinneret into nitrobenzene and then into a bath composed of 50 parts water and 50 parts acetone where the filament is stretched to four times its original length. The resulting dried filament has a tensile strength of 45,000 p. s. i.

Example V 15 parts of polymer prepared according to the method of Example I are dissolved in 85 parts of dimethyl formamide. The solution is heated to 100° C. and cast on to a polished steel surface which is heated to 100° C. A thin, flexible film is formed.

Example VI

A polymer solution containing 15 parts of polyvinylidene cyanide having a molecular weight of approximately 200,000 and 85 parts of tetramethylene sulfone is heated to a temperature of 100° C. and spun through a spinneret into a nitrobenzene bath. After 10 minutes in the nitrobenzene bath, the filament is passed into a bath composed of 10 parts water, 90 parts acetone, and 3½ parts ethylene glycol for a similar length of time. The filament is clear and flexible after drying with steam and has a tensile strength of 30,000 p. s. i.

Although the filaments and films and molded objects prepared according to the methods of this invention are generally colorless or slightly yellow in appearance, it is possible to produce colored filaments, films and molded objects simply by incorporating dyes into the polymer solution.

In addition to possessing high tensile strength, and excellent flexural properties, the polymer products of this invention also have high electrical resistivity, are not attacked by chemicals or microorganisms and do not support combustion, therefore, they are very useful in the manufacture of woven fabrics, knitted fabrics, braided articles, yarns, cords, electrical insulation, pipe coverings, protective clothing, laminates, rods, tubes and multifarious other manufactured articles.

Although the invention has been described in relation to specific examples, it is not intended to limit the invention thereto, for numerous modifications and variations will be apparent to those

We claim:

1. A homopolymer of vinylidene cyanide having a molecular weight in excess of 25,000.

2. A strong flexible synthetic filament of substantial length and of a diameter less than 0.02 inch composed of a homopolymer of vinylidene cyanide having a molecular weight in excess of 25,000.

3. A composition of matter comprising a homopolymer of vinylidene cyanide having a molecular weight in excess of 25,000, dissolved in tetramethylene sulfone.

4. A composition of matter comprising a homopolymer of vinylidene cyanide having a molecular weight in excess of 25,000, dissolved in dimethyl formamide.

5. A composition according to claim 4 comprising 7 to 25% by weight of the homopolymer of vinylidene cyanide.

6. The method which comprises dissolving monomeric material consisting of monomeric vinylidene cyanide in anhydrous organic solvent therefor and maintaining the resulting solution out of contact with water at substantially atmospheric pressure and at a temperature of about 20 to 75° C., whereupon polymerization of said monomeric vinylidene cyanide occurs to form a homopolymer of vinylidene cyanide having a molecular weight in excess of 25,000.

7. The method which comprises dissolving monomeric material consisting of monomeric vinylidene cyanide in tetramethylene sulfone and maintaining the resulting solution out of contact with water at substantially atmospheric pressure and at a temperature of about 20 to 75° C., whereupon polymerization of said monomeric vinylidene cyanide occurs to form a solution of homopolymeric vinylidene cyanide of molecular weight in excess of 25,000, dissolved in said tetramethylene sulfone.

8. The method which comprises dissolving monomeric material consisting of monomeric vinylidene cyanide in dimethyl formamide and maintaining the resulting solution at substantially atmospheric pressure and at a temperature of about 20 to 75° C., whereupon polymerization of said monomeric vinylidene cyanide occurs to form a solution of homopolymeric vinylidene cyanide of molecular weight in excess of 25,000, dissolved in said dimethyl formamide.

9. The method which consists in dissolving monomeric vinylidene cyanide in anhydrous aromatic hydrocarbon solvent, adding to said solution from 0.1 to 2% by weight based on the monomeric vinylidene cyanide of a polymerization catalyst selected from the class consisting of diazothioethers and organic peroxides, and maintaining said solution at substantially atmospheric pressure and at a temperature of 20 to 75° C., whereupon polymerization of said monomeric vinylidene cyanide occurs and particles of homopolymeric vinylidene cyanide of molecular weight above 25,000 precipitate from the solution.

10. The method of claim 9 wherein the aromatic hydrocarbon solvent is dry benzene.

RICHARD F. SCHMIDT.
ALAN E. ARDIS
HARRY GILBERT.

REFERENCES CITED

The following references are of record in the file of this patent:

UNITED STATES PATENTS

| Number | Name | Date |
|---|---|---|
| 2,396,785 | Hanford | Mar. 19, 1946 |
| 2,466,395 | Dickey | Apr. 5, 1949 |
| 2,476,270 | Ardis | July 19, 1949 |

OTHER REFERENCES

Diels et al., Berichte 55, 2439, 40 (1922); Berichte 56, 2076, 77 (1923).

Ostling, Abstracted in C. A. 15, 2829 (1921).